US010795634B2

(12) United States Patent
Li (10) Patent No.: US 10,795,634 B2
(45) Date of Patent: Oct. 6, 2020

(54) METHOD, APPARATUS, AND MOBILE TERMINAL FOR SCREEN MIRRORING

(71) Applicants:Zhejiang Geely Holding Group Co., Ltd., Hangzhou, Zhejiang Province (CN); Zhejiang Geely Automobile Research Institute Co., Ltd., Linhai, Zhejiang Province (CN)

(72) Inventor: Shufu Li, Hangzhou (CN)

(73) Assignees: ZHEJIANG GEELY HOLDING GROUP CO., LTD., Hangzhou, Zhejiang Province (CN); ZHEJIANG GEELY AUTOMOBILE RESEARCH INSTITUTE CO., LTD., Linhai, Zhejiang Province (CN)

( * ) Notice: Subject to any disclaimer, the term of this patent is extended or adjusted under 35 U.S.C. 154(b) by 39 days.

(21) Appl. No.: 16/067,132

(22) PCT Filed: Jun. 7, 2016

(86) PCT No.: PCT/CN2016/085065
§ 371 (c)(1),
(2) Date: Jun. 29, 2018

(87) PCT Pub. No.: WO2017/140071
PCT Pub. Date: Aug. 24, 2017

(65) Prior Publication Data
US 2019/0056904 A1     Feb. 21, 2019

(30) Foreign Application Priority Data
Feb. 19, 2016    (CN) .......................... 2016 1 0092163

(51) Int. Cl.
*G06F 3/14*      (2006.01)
*G09G 5/00*      (2006.01)

(52) U.S. Cl.
CPC ........... *G06F 3/1454* (2013.01); *G09G 5/006* (2013.01); *G09G 2320/0613* (2013.01);
(Continued)

(58) Field of Classification Search
CPC .......... G06F 3/1454; G09G 2320/0613; G09G 5/006; G09G 2350/00; G09G 2370/16; G09G 2370/025
See application file for complete search history.

(56) References Cited

U.S. PATENT DOCUMENTS

2004/0264375 A1*   12/2004   Kim .................... H04N 21/8153
                                                              370/232
2006/0126812 A1    6/2006   Carlson et al.
(Continued)

FOREIGN PATENT DOCUMENTS

CN     101937323 A     1/2011
CN     103176765 A     6/2013
(Continued)

*Primary Examiner* — Alexander Eisen
*Assistant Examiner* — Nathaniel P Brittingham
(74) *Attorney, Agent, or Firm* — Cheng-Ju Chiang (57) ABSTRACT

The present invention provides a screen mirroring method applied to a mobile terminal. The screen mirroring method includes establishing a connection to at least one second terminal device; receiving an operation command; transmitting multimedia files or image signals of the mobile terminals to a corresponding second terminal device according to the operation command, to make the multimedia files or the image signals be instantly displayed on the corresponding second screen terminal. The present invention further provides a screen mirroring apparatus and a mobile terminal.

16 Claims, 5 Drawing Sheets

(52) U.S. Cl.
CPC ... *G09G 2350/00* (2013.01); *G09G 2370/025* (2013.01); *G09G 2370/16* (2013.01)

(56) References Cited

U.S. PATENT DOCUMENTS

| | | | | |
|---|---|---|---|---|
| 2007/0236505 | A1* | 10/2007 | Jung | H04N 1/00347 345/589 |
| 2007/0274400 | A1* | 11/2007 | Murai | H04N 21/25808 375/240.26 |
| 2011/0096087 | A1* | 4/2011 | Chun | G06F 3/04883 345/592 |
| 2013/0219072 | A1* | 8/2013 | Han | H04L 65/602 709/228 |
| 2014/0199947 | A1 | 7/2014 | Jung | |
| 2014/0372621 | A1 | 12/2014 | Jiang et al. | |
| 2015/0067549 | A1* | 3/2015 | Chang | G06F 3/0488 715/761 |
| 2015/0082058 | A1* | 3/2015 | Hahm | G06F 3/1454 713/320 |
| 2015/0082241 | A1* | 3/2015 | Kang | G06F 3/04845 715/803 |
| 2015/0381704 | A1* | 12/2015 | Dadu | G06F 16/116 715/748 |
| 2018/0151150 | A1* | 5/2018 | Volpi | G06F 3/1454 |
| 2019/0056904 | A1* | 2/2019 | Li | G09G 5/006 |

FOREIGN PATENT DOCUMENTS

| | | |
|---|---|---|
| CN | 103257813 A | 8/2013 |
| CN | 103581337 A | 2/2014 |
| CN | 103796073 A | 5/2014 |
| CN | 103870191 A | 6/2014 |
| CN | 103905404 A | 7/2014 |
| EP | 2621145 A1 | 7/2013 |

* cited by examiner

METHOD, APPARATUS, AND MOBILE TERMINAL FOR SCREEN MIRRORING

CROSS REFERENCE TO RELATED APPLICATION

The present application is a 35 U.S.C. § 371 National Phase conversion of International (PCT) Patent Application No. PCT/CN2016/085065, filed on Jun. 7, 2016, which is based on and claims priority of Chinese Patent Application No. 201610092163.6, filed on Feb. 19, 2016. The entire disclosure of the above-identified application, including the specification, drawings and claims are incorporated herein by reference in its entirety. The PCT International Patent Application was filed and published in English.

FIELD OF THE INVENTION

The present invention relates to internet technology, and more particularly to a screen mirroring method, and an apparatus and a mobile terminal for screen mirroring.

BACKGROUND OF THE INVENTION

With rapid development of terminal technology, mobile terminals, such as mobile phones or tablet computers, are used to open multimedia files, such as graphics, documents, slides, and videos, by more people.

Because screens of the mobile terminals are small, problems such as font sizes too small will appear when users open multimedia files by the mobile terminals. This brings inconveniences when mobile terminals are used to communicate in work and life. Accordingly, screen mirroring technology is generated. Screen mirroring technology generally refers to instantly display a content displayed on a screen to another screen, for example, displaying a screen of a computer on a television (TV), or displaying a screen of a mobile phone on a television. The content be displayed includes videos, audio and other multimedia information. However, the current screen mirroring technology has complicated operations and poor flexibility.

SUMMARY OF THE INVENTION

For the abovementioned reasons, the present invention provides a screen mirroring method with simple operations and good flexibility.

The embodiments of the present invention provide a screen mirroring method being applied to a mobile terminal. The screen mirroring method includes the following steps: establishing a connection to at least one second terminal device; receiving an operation command; transmitting multimedia files or image signals of the mobile terminal to a corresponding second terminal device according to the operation command, making the multimedia files or the image signals be instantly displayed on the corresponding second screen terminal.

The present invention further provides a screen mirroring apparatus. The screen mirroring apparatus includes a connection module, an input module, a control module and a transmission module. The connection module is configured for establishing a connection with at least one second screen terminal. The input module is configured for receiving an operation command. The control module is configured for controlling the transmission module to transmit multimedia files or image signals of a mobile terminal to a corresponding second screen terminal according to the received operation command, to make the second screen terminal instantly display the multimedia files or the image signals.

The present invention further provides a mobile terminal with a screen mirroring apparatus. The screen mirroring apparatus includes a connection module, an input module, a control module and a transmission module. The connection module is configured for establishing a connection with at least one second screen terminal. The input module is configured for receiving an operation command. The control module is configured for controlling the transmission module to transmit multimedia files or image signals of a mobile terminal to a corresponding second screen terminal according to the received operation command, to make the second screen terminal instantly display the multimedia files or the image signals.

According to the screen mirroring method, the screen mirroring apparatus and the mobile terminal of the present invention, the multimedia files or the image signals of the mobile terminal are transmitted to the corresponding second screen terminal due to the received operation command, so that the multimedia files or the image signals are instantly displayed on the corresponding second screen terminal, which makes the operation simple and have good flexibility.

In order to make the abovementioned purposes, characteristics and advantages be more apparent and understandable, detailed descriptions accompanying preferred embodiments and drawings are given below.

DETAILED DESCRIPTION OF PREFERRED EMBODIMENTS

Embodiments of the present invention will now be described more apparently and completely with reference to the drawings of the embodiments. Obviously, the illustrated embodiments are only a part but not all of the embodiments of the present invention. All the other embodiments which could be obtained without creativity by one of ordinary skill in the art according to the illustrated embodiments would be claimed within the scope of the present invention.

Figure 1:
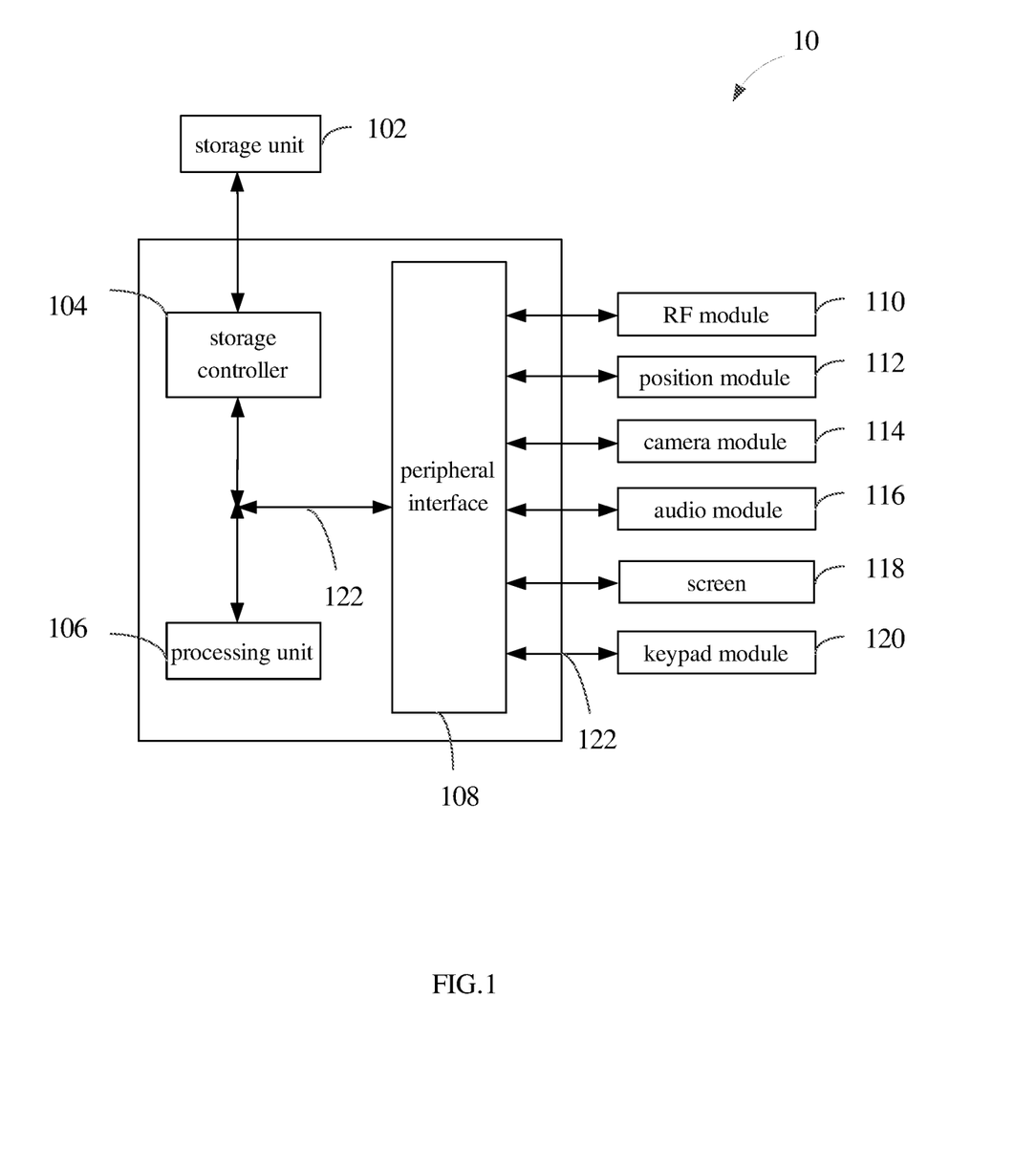
FIG. 1 shows a block diagram of a mobile terminal according to an embodiment of the present invention.

FIG. 1 shows a block diagram of a mobile terminal according to an embodiment of the present invention. Referring to FIG. 1, the mobile terminal 10 includes a storage unit 102, a storage controller 104, one or more processing unit 106 (only one is shown in FIG. 1), a peripheral interface 108, a radio frequency module 110, a position module 112, a camera module 114, an audio module 116, a screen 118 and a keypad module 120. The abovementioned components intercommunicate through one or more communication bus or signal line 122.

It should be understood that the structure shown in FIG. 1 is only for schematic illustration and the mobile terminal 10 may further include more or less components than the structure shown in FIG. 1, or may have different components and arrangement. The components shown in FIG. 1 could be realized by hardware, software and their combination.

The storage unit 102 may be used to store software program and module, such as programs/modules corresponding to the screen mirroring method and/or apparatus. The processing unit 106 executes the software programs and modules stored in the storage unit 102 to perform various applications of different functions and data processing to realize the screen mirroring method.

The storage unit 102 may include high-speed RAM memory and nonvolatile memory (NVM), such as one or more magnetic storage device, flash memory or other nonvolatile memories. In some embodiments, the storage unit 102 may further include a plurality of storage units remote from the processing unit 106. The remote storage units may be connected to the mobile terminal 10 by network. The network includes but is not limited to Internet, Intranet, Wireless Local Area Network (WLAN), Mobile Communication Network, or their combination. The processing unit 106 and other possible components could visit the storage unit 102 under the control of the storage controller 104.

The peripheral interface 108 couples various inputs/input devices to CPU and the storage unit 102. The processing unit 106 performs various software and/or commands stored in the storage unit 102 to execute various functions of the mobile terminal 10 and data processing.

In some embodiments, the peripheral interface 108, the processing unit 106 and the storage controller 104 may be integrated into one chip. In other embodiments, the peripheral interface 108, the processing unit 106 and the storage controller 104 may be arranged in individual chips.

The radio frequency module 110 is used for transmitting and receiving electromagnetic waves and realizing conversion between the electromagnetic waves and electrical signals, thereby communicating with the communication network and other devices. The radio frequency module 110 may include a plurality of current circuit components, such as antenna, RF receiver and transmitter, digital signal processor, encryption/decryption chip, SIM (subscriber identity module) card, memorizer and so on, for performing the abovementioned functions. The radio frequency module 110 may communicate with various networks such as Internet, Intranet or wireless network, or may communicate with other devices through wireless network. The wireless network may be Cellular Telephone Network, Wireless Local Area Network or Metropolitan Area Network (MAN). The wireless network may use various communication standards, protocols and technologies, may include but is not limited to Global System for Mobile Communication (GSM), Enhanced Data GSM Environment (EDGE), Wideband Code Division Multiple Access (W-CDMA), Code Division Access (CDMA), Time Division Multiple Access (TDMA), bluetooth, Wireless Fidelity (WiFi) (such as Institute of Electrical and Electronics Engineers standard IEEE 802.11a, IEEE 802.11b, IEEE802.11g and/or IEEE 802.11n), Voice over Internet Protocol (VoIP), Worldwide Interoperability for Microwave Access (Wi-Max), other protocols for mail, instant messaging (IM) and short message service (SMS), and any other appropriate communication protocols, even the undeveloped protocols.

The position module 112 is used for obtaining the current position of the mobile terminal 10. The position module 112 includes but is not limited to Global Positioning System (GPS), and position technologies based on Wireless Local Area Network or Mobile Communication Network.

The camera module 114 is used for taking photos or shooting videos. The photos or videos may be stored in the storage unit 102 and be transmitted by the radio frequency module 110.

The audio module 116 is used for providing audio interface for users, which may include one or more microphone, one or more loudspeaker, and voice frequency circuits. The voice frequency circuits receive voice data from the peripheral interface 108, converse the voice data into electrical signals, and transmit the electrical signals to the loudspeaker. The loudspeaker converses the electrical signals to sound waves which could be heard by human ears. The voice frequency circuits also could receive electrical signals from the microphone, converse the electrical signals to voice data and transmit the voice data to the peripheral interface 108 for further processing. The voice data could be obtained from the storage unit 102 or through the radio frequency module 110. Otherwise, the voice data also could be stored in the storage unit 102 or transmitted through the radio frequency module 110. In some embodiments, the audio module 116 may further include an earphone jack, for providing audio interface for earphone or other devices.

The screen 118 provides an output interface between the mobile terminal 10 and the user. More concretely, the screen 118 displays video output for the users. The video output may include text, graphic, video and their combination. Some of the outputs correspond to user interface objects. It is understood that the screen 118 may further include a touch screen. The touch screen provides an input and output interface between the mobile terminal 10 and the user. Besides displaying video output, the touch screen could also accept user input, such as click, slide, and other operation gestures, so that the user interface object could make a response to the user input. Technologies for testing user input may be resistive, capacitive, or any other viable touch test technology. The touch screen includes but is not limited to Liquid Crystal Display (LCD) or Polymer Light-emitting Display (PLED).

The keypad module 120 also provides an input interface for users to the mobile terminal 10. The users could press different keys to make the mobile terminal 10 perform different functions.

Embodiment 1

Figure 2:
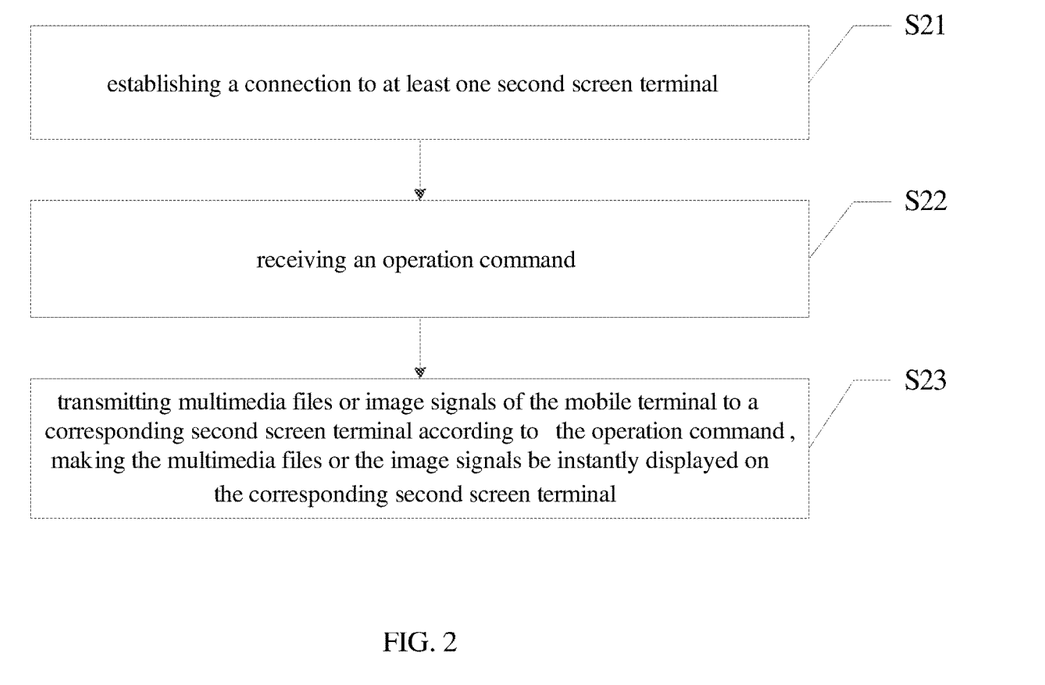
FIG. 2 shows a flow chart of a screen mirroring method according to a first embodiment of the present invention.
Figure 3:
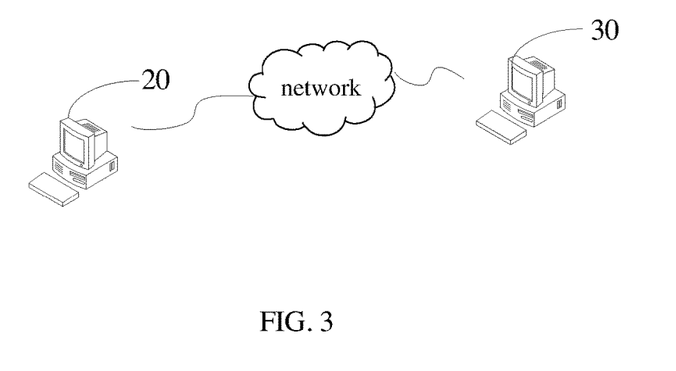
FIG. 3 shows a schematic view of an application environment of the screen mirroring method shown in FIG. 2.

FIG. 2 shows a flow chart of a screen mirroring method according to a first embodiment of the present invention. FIG. 3 shows a schematic view of an application environment of the screen mirroring method shown in FIG. 2. Referring to FIG. 2, the screen mirroring method may be applied to, but not limited to, the mobile terminal 20 shown in FIG. 1. The mobile terminal 20 may be mobile phone, tablet computer, and other electronic devices. Referring to FIGS. 2 and 3, the screen mirroring method includes the following steps.

Step S21: establishing a connection to at least one second screen terminal 30.

The second screen terminal 30 may include, but is not limited to mobile phone, tablet computer, desktop computer, television, display, and other electronic devices.

The connection to one or more second screen terminal 30 is established through various networks such as internet, intranet, wireless network and so on. More concretely, the connection to the second screen terminal 30 is directly established through wireless hotspot technology, bluetooth communication technology or infrared communication technology. This avoids the use of transit routers, enabling fast signal transmission between the mobile terminal 20 and the second screen terminal 30 and reducing signal delay.

When the mobile terminal 20 searches more than one second screen terminals 30, the connection may be but is not limited to be established to one or more second screen terminals 30 selectively according to icons of the second screen terminals 30. The mobile terminal 20 may be but is not limited to be triggered by swinging or shaking the mobile terminal 20 to send infrared signals to a corresponding second screen terminal 30, so that a connection for signal transmission is established to the corresponding second screen terminal 30.

Step S22: receiving an operation command.

The operation command may include but is not limited to click, sliding, swinging or their combination.

Step S23: transmitting multimedia files or image signals of the mobile terminal 20 to a corresponding second screen terminal 30 according to the operation command, making the multimedia files or the image signals be displayed instantly on the corresponding second screen terminal 30.

More concretely, all of the multimedia files displayed on the mobile terminal 20 could be transmitted to the corresponding second screen terminal 30 according to the operation command, or only the selected at least one multimedia file be transmitted to the corresponding second screen terminal 30 according to the operation command. For example, when receiving an operation command of clicking a screen mirroring key, all of the multimedia files displayed on the mobile terminal 20 are transmitted to the corresponding second screen terminal 30 according to the operation command. Further for example, when receiving an operation command of sliding the screen mirroring key, all of the multimedia files displayed on the mobile terminal 20 are transmitted to the corresponding second screen terminal 30 according to the operation command. The screen mirroring key includes but not limited to actual key.

More concretely, the second screen terminal 30 processes and instantly displays the multimedia files after receiving the multimedia files. The second screen terminal 30 directly displays the image information after receiving the image information. b10

The multimedia files may but not limited to be graphics, documents, videos, audio, webpage information and so on. The multimedia files may be but are not limited to information received by the mobile terminal 20 from other terminals through instant communication systems and so on. The multimedia files may also be information generated through cameras of the mobile terminal 20 and so on. The graphic information may be graphics obtained from the mobile terminal 20 by screen shot technology or other means. The graphic information may also be display control signals corresponding to the multimedia files after the multimedia files being processed by the mobile terminal 20.

More concretely, when the mobile terminal 20 only connects with one second screen terminal 30, at least one multimedia file or image signal of the mobile terminal 20 is transmitted to the second screen terminal 30 according to the received operation command.

For example, when an operation command of pressing a multimedia file icon for a long time is received, a menu including screen mirroring key will be generated, and when an operation command of clicking the screen mirroring key is further received, a multimedia file corresponding to the multimedia file icon is transmitted to the second screen terminal 30. Further for example, when an operation command of clicking the displayed screen mirroring key on the mobile terminal 20 is received, at least one multimedia file icon is displayed, and when an operation command of clicking the multimedia file icon is further received, the multimedia file corresponding to the clicked multimedia file icon is transmitted to the second screen terminal 30.

More concretely, when the mobile terminal 20 is connected with a plurality of second screen terminals 30, at least one multimedia file or image signal of the mobile terminal 20 is transmitted to the selected second screen terminal 30 according to the received operation command.

For example, when an operation command of clicking a screen mirroring icon is received, and an operation command that user's finger slides toward one of the second screen terminals 30 is further received, a multimedia file corresponding to the multimedia file icon is transmitted to the second screen terminal 30 which locates on the sliding direction. Further for example, when an operation command of clicking the multimedia file icon is received, and an operation command of swinging the multimedia file icon toward one of the second screen terminals 30 is further received, a multimedia file corresponding to the swung multimedia file icon is transmitted to the second screen terminal 30 which locates on the swinging direction. The location of the second screen terminal 30 may be a physical location of the second screen terminal 30 or a virtual location manually set by the user.

According to the screen mirroring method of the present invention, the multimedia files or the image signals of the mobile terminal 20 are transmitted to the corresponding second screen terminal 30 due to the received operation command, so that the second screen terminal 30 could display the multimedia files or the image signals instantly, which makes the operation simple and have good flexibility.

Embodiment 2

Figure 4:
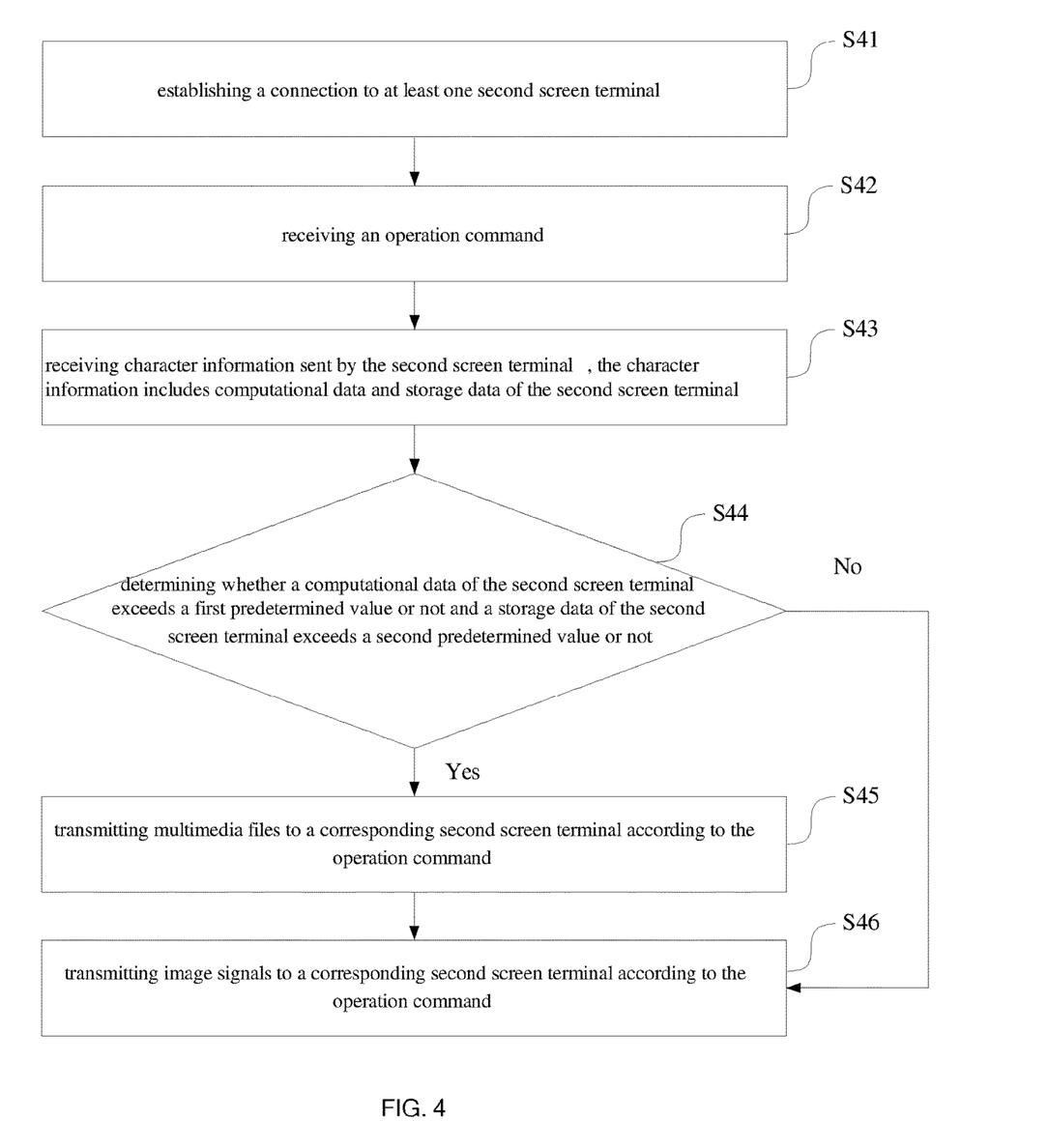
FIG. 4 shows a flow chart of a screen mirroring method according to a second embodiment of the present invention.

FIG. 4 shows a flow chart of a screen mirroring method according to a second embodiment of the present invention. Referring to FIG. 4, the screen mirroring method includes the following steps.

Step S41: establishing a connection to at least one second screen terminal.

The connection to one or more second screen terminal is but is not limited to be established through various networks such as internet, intranet, wireless network and so on. More concretely, the connection to the second screen terminal is directly established through wireless hotspot technology, bluetooth communication technology or infrared communication technology. This avoids the use of transit routers, enables fast signal transmission between the mobile terminal and the second screen terminal and reduces signal delay.

When the mobile terminal searches for more than one second screen terminals, the connection may but is not limited to be established to one or more second screen terminals selectively according to icons of the second screen terminals. The mobile terminal may be but is not limited to be triggered by swinging or shaking the mobile terminal to send infrared signals to a corresponding second screen terminal, so that a connection for signal transmission is established to the second screen terminal.

Step S42: receiving an operation command.

The operation command may include but is not limited to click, sliding, swinging or their combination.

Step S43: receiving character information sent by the second screen terminal. The character information includes a calculation data and a storage data of the second screen terminal. The calculation data indicates the calculation capability of the second screen terminal, and the storage data indicates the storage capability of the second screen terminal.

It could be understood by one of ordinary skill in the art that the order of steps S42 and S43 is not limited to the abovementioned order. That is, the mobile terminal could receive the character information sent by the second screen terminal first and then receive the operation command and transmit the multimedia file and the image information to the second screen terminal. Otherwise, the character information of the second screen terminal could be sent after receiving a request from the mobile terminal, or be directly included in broadcasting signals sent by the second screen terminal to inform that the second screen terminal could be used for screen mirroring.

Step S44: determining whether the calculation data of the second screen terminal exceeds a first predetermined value or not and the storage data of the second screen terminal exceeds a second predetermined value or not.

When the calculation data of the second screen terminal does not exceed the first predetermined value and the storage data of the second screen terminal does not exceed the second predetermined value, the method goes into step S45: transmitting multimedia files to a corresponding second screen terminal according to the operation command.

In an embodiment of the present invention, after the multimedia files are transmitted to the corresponding second screen terminal, the mobile terminal could be used as an input device, such as a mouse, a keyboard or a touchpad of the second screen terminal, for receiving input signals and transmitting the input signals to the corresponding second screen terminal, which makes the second screen terminal could respond to the input signals and facilitates the operation of the user.

When the calculation data of the second screen terminal exceeds the first predetermined value or the storage data of the second screen terminal exceeds the second predetermined value, the method goes into step S46: transmitting image signals to a corresponding second screen terminal according to the operation command.

It could be understood by one of ordinary skill in the art that the multimedia files or the image signals may also be but is not limited to be transmitted to the second screen terminal selectively according to the calculation or storage capability of the mobile terminal.

According to the screen mirroring method of the present invention, the multimedia files or the image signals of the mobile terminal are transmitted to the corresponding second screen terminal due to the calculation and storage data feedback from the second screen terminal. Therefore, the multimedia files are transmitted to the second screen terminal directly when the second screen terminal has good calculation and storage capability, which helps to save calculation, storage and power resource of the mobile terminal. When the second screen terminal has poor calculation and storage capability, the image signals are transmitted to the second screen terminal directly. Therefore, screen mirroring function between the mobile terminal and the second screen terminal is realized with flexibility.

Embodiment 3

Figure 5:
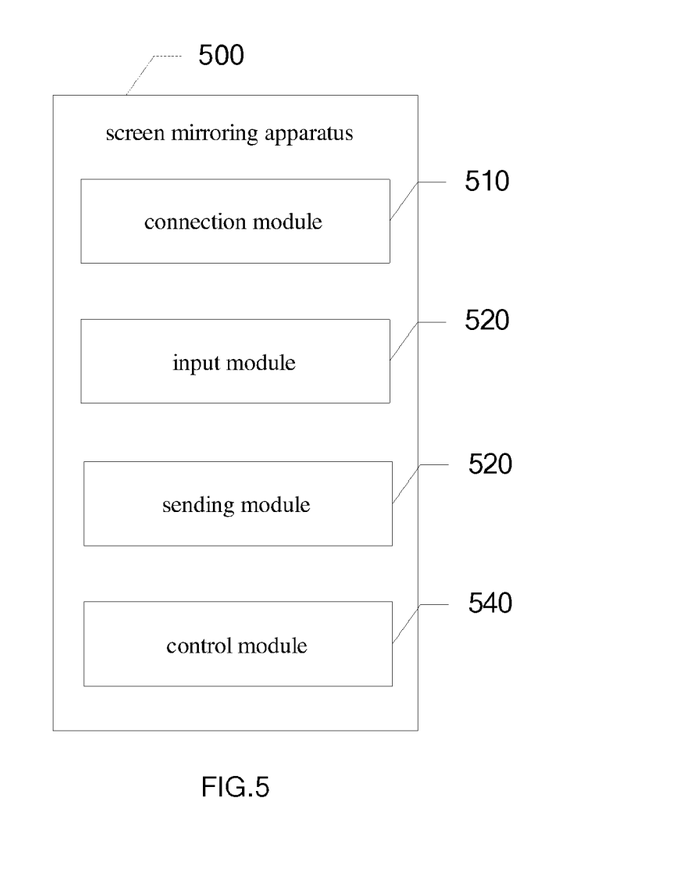
FIG. 5 shows a block diagram of a screen mirroring apparatus according to a third embodiment of the present invention.

FIG. 5 shows a block diagram of a screen mirroring apparatus according to a third embodiment of the present invention. Referring to FIG. 5, the screen mirroring apparatus 500 includes a connection module 510, an input module 520, a transmission module 530 and a control module 540.

The connection module 510 is used for establishing a connection to at least one second screen terminal.

The connection to one or more second screen terminal may be but is not limited to be established through various networks such as internet, intranet, wireless network and so on. More concretely, the connection to the second screen terminal may be but is not limited to be directly established through wireless hotspot technology, bluetooth communication technology or infrared communication technology. This avoids the use of transit routers, enables fast signal transmission between the mobile terminal and the second screen terminal and reduces signal delay.

When the mobile terminal searches for more than one second screen terminals, the connection may be but is not limited to be established to one or more of the second screen terminals selectively according to identifications of the second screen terminals. The mobile terminal may be but is not limited to be triggered through swinging or shaking the mobile terminal to send infrared signals to a corresponding second screen terminal, for establishing a connection for signal transmission to the second screen terminals.

The input module 520 is used for receiving an operation command. The operation command may include but is not limited to click, sliding, swinging or their combination.

The control module 540 is used for controlling the transmission module 530 to send multimedia files or image signals of the mobile terminal to the corresponding second screen terminal according to the received operation command, to make the second screen terminal display the multimedia files or the image signals instantly.

More concretely, all of the multimedia files displayed on the mobile terminal could be transmitted to the corresponding second screen terminal according to the operation command, or only the selected at least one multimedia file could be transmitted to the corresponding second screen terminal according to the operation command. For example, when receiving an operation command of clicking a screen mirroring key, all of the multimedia files displayed on the mobile terminal are transmitted to the corresponding second screen terminal according to the operation command. Further for example, when receiving an operation command of sliding the screen mirroring key, all of the multimedia files displayed on the mobile terminal are transmitted to the corresponding second screen terminal according to the operation command. The screen mirroring key includes but is not limited to actual key.

More concretely, the multimedia files may be but is not limited to videos, audio, webpage information and so on. The multimedia files may be but is not limited to information received by the mobile terminal from other terminals through instant communication systems and so on. The multimedia files may also be information generated through cameras of the mobile terminal and so on. The graphic information may be graphics obtained from the mobile terminal by screen shot technology or other means.

More concretely, when the mobile terminal only connects with one second screen terminal, at least one multimedia file or image signal of the mobile terminal is transmitted to the second screen terminal according to the received operation command.

In an embodiment of the present invention, the screen mirroring apparatus further includes a display module. The display module is used for displaying at least one multimedia file icon so that the transmission module 530 transmits at least one multimedia file corresponding to the at least one multimedia file icon to the corresponding second screen terminal according to the operation command received by the input module 520.

For example, when an operation command of pressing a multimedia file icon for a long time is received, a menu including screen mirroring key will be generated, and when an operation command of clicking the screen mirroring key is further received, a multimedia file corresponding to the multimedia file icon is transmitted to the second screen terminal. Further for example, when an operation command of clicking the displayed screen mirroring key on the mobile terminal is received, at least one multimedia file icon is displayed, and when an operation command of clicking the multimedia file icon is further received, the multimedia file corresponding to the clicked multimedia file icon is transmitted to the second screen terminal.

More concretely, when the mobile terminal is connected with a plurality of second screen terminals, at least one multimedia file or image signal of the mobile terminal is transmitted to the selected second screen terminal according to the received operation command.

For example, when an operation command of clicking the screen mirroring icon is received, and an operation command that user's finger slides toward one of the second screen terminals is further received, a multimedia file corresponding to the multimedia file icon is transmitted to the second screen terminal which locates on the sliding direction. Further for example, when an operation command of clicking the multimedia file icon is received, and an operation command of swinging the multimedia file icon toward one of the second screen terminals is further received, a multimedia file corresponding to the swung multimedia file icon is transmitted to the second screen terminal which locates on the swinging direction. The location of the second screen terminal may be a physical location of the second screen terminal or a virtual location manually set by the user.

According to the screen mirroring apparatus of the present invention, the multimedia files or the image signals of the mobile terminal are transmitted to the corresponding second screen terminal due to the received operation command, so that the second screen terminal could display the multimedia files or the image signals instantly, which makes the operation simple and have good flexibility.

Embodiment 4

Figure 6:
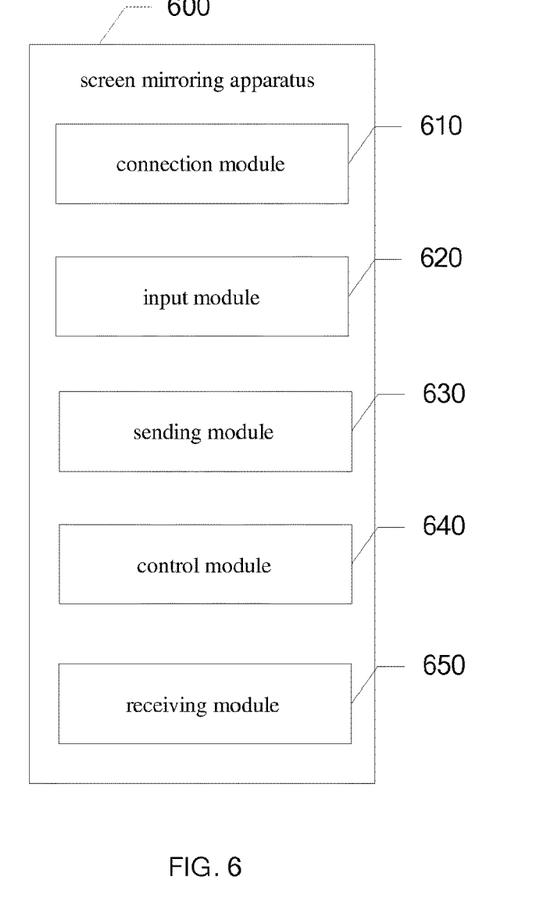
FIG. 6 shows a block diagram of a screen mirroring apparatus according to a fourth embodiment of the present invention

FIG. 6 shows a block diagram of a screen mirroring apparatus according to a fourth embodiment of the present invention. Referring to FIG. 6, the screen mirroring apparatus 600 includes a connection module 610, an input module 620, a transmission module 630, a control module 640 and a receiving module 650.

The receiving module 650 is used for receiving character information sent by the second screen terminal. The character information includes a computational data and a storage data of the second screen terminal.

The control module 640 is used for controlling the transmission module 630 to transmit multimedia files to a corresponding second screen terminal according to the operation command when the calculation data of the second screen terminal does not exceed a first predetermined value and the storage data of the second screen terminal does not exceed a second predetermined value, or controlling the transmission module 630 to transmit image signals to a corresponding second screen terminal according to the operation command when the calculation data of the second screen terminal exceeds a first predetermined value or the storage data of the second screen terminal exceeds a second predetermined value.

In an embodiment of the present invention, the input module 620 is further used for receiving input signals. The transmission module 630 is further used for sending the input signals to the corresponding second screen terminal to make the second screen terminal respond to the input signals.

Embodiment 5

Figure 7:
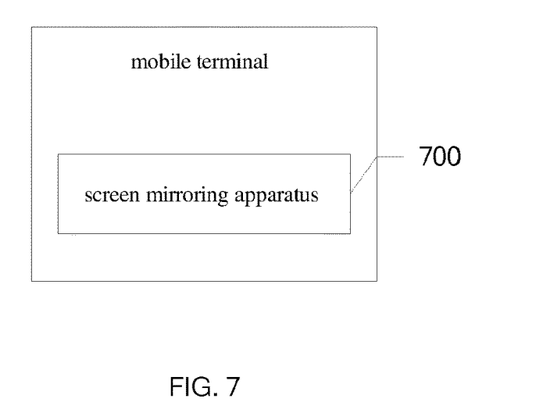
FIG. 7 shows a block diagram of a mobile terminal according to a fifth embodiment of the present invention.

FIG. 7 shows a block diagram of a mobile terminal according to a fifth embodiment of the present invention. Referring to FIG. 7, the mobile terminal includes a screen mirroring apparatus 700. The screen mirroring apparatus 700 may be the screen mirroring apparatus 500 of FIG. 5 or the screen mirroring apparatus 600 of FIG. 6, and details are not given. Otherwise, the mobile terminal may be the mobile terminal 10 of FIG. 1.

According to the screen mirroring method, the screen mirroring apparatus and the mobile terminal of the present invention, the multimedia files or the image signals of the mobile terminal are transmitted to the corresponding second screen terminal due to the received operation command, so that the second screen terminal could display the multimedia files or the image signals instantly, which makes the operation simple and have flexibility.

It should be noted that the embodiments of the present invention are described in progressive manner. Descriptions of each embodiment are focused on the differences from other embodiments, same or similar parts of the embodiments could be cross referenced. Since embodiments of the apparatus are similar to embodiments of the method, its descriptions are relative simple and related descriptions could refer to corresponding descriptions of the embodiments of the method.

It should be noted that the relational terms in the present invention such as first and second are only used to distinguish one entity or operation to another entity or operation, but not to claim or imply the entities or operations are arranged in this kind of actual relations or orders. Furthermore, the terms "include" "contain" or any other variants mean to claim nonexclusive including, so that the procedure, method, item or apparatus including a series of elements not only include the said elements but also include any other elements which are not illustrated, or include some elements which are include in the procedure, method, item or apparatus inherently. Without more restrictions, the elements claimed by the term "include a . . . " does not exclude the procedure, method, item or apparatus with the claimed elements further including the same elements.

It should be understood by one of ordinary skill in the art that all or parts of the steps of the forgoing embodiments could be performed directly by hardware, or by hardware commanded by procedure. The procedure could be stored in computer readable storage medium and the storage medium could be read-only memory, magnetic disk or CD-ROM.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A screen mirroring method applied to a mobile terminal, comprising:
   establishing a connection to at least one second screen terminal;
   receiving an operation command;
   transmitting one of multimedia files and image signals of the mobile terminal to a corresponding second screen terminal according to the operation command, to make the multimedia files or the image signals be instantly displayed on the corresponding second screen terminal;
   wherein the step of transmitting one of multimedia files and image signals of the mobile terminal to a corresponding second screen terminal according to the operation command comprises:
   receiving a character information sent by the second screen terminal, the character information comprising a calculation data and a storage data of the second screen terminal;
   determining whether the calculation data of the second screen terminal exceeds a first predetermined value or not, and whether the storage data of the second screen terminal exceeds a second predetermined value or not;
   transmitting the multimedia files to the corresponding second screen terminal according to the operation command when the calculation data of the second screen terminal does not exceed the first predetermined value and the storage data of the second screen terminal does not exceed the second predetermined value;
   transmitting the image signals to the corresponding second screen terminal according to the operation command when the calculation data of the second screen terminal exceeds the first predetermined value; and
   transmitting the image signals to the corresponding second screen terminal according to the operation command when the storage data of the second screen terminal exceeds the second predetermined value.

2. The screen mirroring method according to claim 1, wherein after the step of transmitting the image signals to a corresponding second screen terminal according to the operation command, the method comprises:
   receiving input signals; and
   transmitting the input signals to the corresponding second screen terminal to make the second screen terminal respond to the input signals.

3. The screen mirroring method according to claim 1, wherein the operation command comprises click, sliding, or swinging operation.

4. The screen mirroring method according to claim 1, wherein the screen mirroring method further comprises:
   displaying at least one multimedia file icon;
   transmitting at least one multimedia file corresponding to the at least one multimedia file icon to the corresponding second screen terminal according to the operation command.

5. A screen mirroring apparatus comprising:
   a connection module configured for establishing a connection with at least one second screen terminal;
   an input module configured for receiving an operation command;
   a control module configured for controlling a transmission module to send one of multimedia files and image signals of a mobile terminal to a corresponding second screen terminal according to the received operation command, to make the second screen terminal instantly display the multimedia files or the image signals;
   wherein the screen mirroring apparatus further comprises a receiving module configured for receiving a character information sent by the second screen terminal, the character information comprises a calculation data and a storage data of the second screen terminal, the control module is configured for controlling the transmission module transmitting the multimedia files to the corresponding second screen terminal according to the operation command when the calculation data of the second screen terminal does not exceed a first predetermined value and the storage data of the second screen terminal does not exceed a second predetermined value, the control module is further configured for controlling the transmission module transmitting the image signals to the corresponding second screen terminal according to the operation command when the calculation data of the second screen terminal exceeds the first predetermined value, and controlling the transmission module transmitting the image signals to the corresponding second screen terminal according to the operation command when the storage data of the second screen terminal exceeds the second predetermined value.

6. The screen mirroring apparatus according to claim 5, wherein the input module is further configured for receiving input signals, the transmission module is further configured for sending the input signals to the corresponding second screen terminal to make the second screen terminal respond to the input signals.

7. The screen mirroring apparatus according to claim 5, wherein the operation command comprises click, sliding, or swinging operation.

8. The screen mirroring apparatus according to claim 5, wherein the screen mirroring apparatus further comprises a display module, the display module is configured for displaying at least one multimedia file icon so that the transmission module transmits at least one multimedia file corresponding to the at least one multimedia file icon to the corresponding second screen terminal according to the operation command received by the input module.

9. The screen mirroring method according to claim 1, wherein the step of establishing a connection to at least one second screen terminal comprises:
   searching for more than one second screen terminals;
   establishing a connection to the one or more second screen terminals selectively according to icons of the second screen terminals.

10. The screen mirroring method according to claim 9, wherein the step of establishing a connection to the one or more second screen terminals selectively according to icons of the second screen terminals comprises:
    triggering the mobile terminal by swinging or shaking the mobile terminal to send infrared signals to a corresponding second screen terminal;
    establishing a connection to the one or more second screen terminals.

11. The screen mirroring method according to claim 1, wherein the step of transmitting one of multimedia files and image signals of the mobile terminal to a corresponding second screen terminal according to the operation command, to make the multimedia files or the image signals be instantly displayed on the corresponding second screen terminal, comprising:
    receiving an operation command of pressing a multimedia file icon for a long time;

generating a menu including a screen mirroring key;

transmitting a multimedia file corresponding to a multimedia file icon to the second screen terminal when an operation command of clicking the screen mirroring key is further received.

12. The screen mirroring method according to claim 1, wherein the step of transmitting one of multimedia files and image signals of the mobile terminal to a corresponding second screen terminal according to the operation command, to make the multimedia files or the image signals be instantly displayed on the corresponding second screen terminal, comprising:

receiving an operation command of clicking a displayed screen mirroring key on the mobile terminal;

displaying at least one multimedia file icon;

transmitting a multimedia file corresponding to a clicked multimedia file icon to the second screen terminal when an operation command of clicking the multimedia file icon is further received.

13. A mobile terminal comprising a screen mirroring apparatus according to claim 5, wherein the screen mirroring apparatus further comprises a receiving module configured for receiving a character information sent by the second screen terminal, the character information comprises a calculation data and a storage data of the second screen terminal, the control module is configured for controlling the transmission module transmitting the multimedia files to the corresponding second screen terminal according to the operation command when the calculation data of the second screen terminal does not exceed a first predetermined value and the storage data of the second screen terminal does not exceed a second predetermined value, the control module is also configured for controlling the transmission module transmitting the image signals to the corresponding second screen terminal according to the operation command when the calculation data of the second screen terminal exceeds the first predetermined value, and controlling the transmission module transmitting the image signals to the corresponding second screen terminal according to the operation command when the storage data of the second screen terminal exceeds the second predetermined value.

14. The mobile terminal according to claim 13, wherein the input module is further configured for receiving input signals, the transmission module is further configured for sending the input signals to the corresponding second screen terminal to make the second screen terminal respond to the input signals.

15. The mobile terminal according to claim 13, wherein the operation command comprises click, sliding, or swinging operation.

16. The mobile terminal according to claim 13, wherein the screen mirroring apparatus further comprises a display module, the display module is configured for displaying at least one multimedia file icon so that the transmission module transmits at least one multimedia file corresponding to the at least one multimedia file icon to the corresponding second screen terminal according to the operation command received by the input module.

* * * * *